(12) United States Patent
Leon

(10) Patent No.: US 6,562,430 B1
(45) Date of Patent: May 13, 2003

(54) PACKETING FIBERS FOR CASTABLE COMPOSITIONS

(75) Inventor: Craig K. Leon, Acton, MA (US)

(73) Assignee: W.R. Grace & Co.-Conn, Columbia, MD (US)

( * ) Notice: Subject to any disclaimer, the term of this patent is extended or adjusted under 35 U.S.C. 154(b) by 0 days.

(21) Appl. No.: 09/890,623
(22) PCT Filed: Feb. 10, 2000
(86) PCT No.: PCT/US00/03514
§ 371 (c)(1), (2), (4) Date: Aug. 2, 2001
(87) PCT Pub. No.: WO00/49211
PCT Pub. Date: Aug. 24, 2000

Related U.S. Application Data

(60) Provisional application No. 60/120,936, filed on Feb. 19, 1999.

(51) Int. Cl.[7] .................................................. B32B 3/10
(52) U.S. Cl. .......................... 428/43; 428/361; 428/119; 428/373; 366/2; 366/150.1; 206/443; 156/297
(58) Field of Search ........................... 428/43, 119, 120, 428/90, 359, 361, 373; 366/2, 150.1; 206/443; 156/297

(56) References Cited

U.S. PATENT DOCUMENTS

| | | | |
|---|---|---|---|
| 2,681,863 A | 6/1954 | Croce et al. | 106/109 |
| 2,820,282 A | 1/1958 | Schneider | 29/200 |
| 3,289,371 A | 12/1966 | Pearson et al. | 52/338 |
| 3,386,320 A | 6/1968 | Pinkham et al. | 83/23 |
| 3,521,347 A | 7/1970 | Bentley | 29/427 |
| 3,716,386 A | 2/1973 | Kempster | 106/90 |
| 3,785,026 A | 1/1974 | Ohmstede | 29/157.4 |
| 3,889,442 A | 6/1975 | Grahn et al. | 53/3 |
| 3,949,890 A | 4/1976 | Keller | 214/152 |
| 4,036,380 A | 7/1977 | Berry et al. | 214/305 |
| 4,224,377 A | 9/1980 | Moens | 428/369 |
| 4,284,667 A | 8/1981 | Moens | 427/331 |
| 4,314,853 A | 2/1982 | Moens | 106/99 |
| 4,339,221 A | 7/1982 | Mitzel et al. | 414/114 |
| 4,414,030 A | 11/1983 | Restrepo | 106/90 |
| 4,430,039 A | 2/1984 | Boucherie | 414/417 |
| 4,660,818 A | 4/1987 | Conner et al. | 270/1.1 |
| 4,745,259 A | 5/1988 | Boucherie | 414/412 |
| 4,820,585 A | 4/1989 | Tedesco et al. | 428/360 |
| 5,399,195 A | 3/1995 | Hansen et al. | 106/711 |
| 5,753,368 A | 5/1998 | Berke et al. | 428/375 |
| 5,807,458 A | 9/1998 | Saunders et al. | 156/276 |

FOREIGN PATENT DOCUMENTS

| | | | |
|---|---|---|---|
| WO | 94/25702 | 11/1994 | 5/7 |
| ZA | 985302 | 6/1998 | |

Primary Examiner—Alexander S. Thomas
(74) Attorney, Agent, or Firm—Craig K. Leon, Esq.; William L. Baker, Esq.

(57) ABSTRACT

Packeted fibers comprise a plurality of fibers arranged in side-by-side manner, said plurality of fibers being cut perpendicularly to obtain terminal cut ends, and said terminal cut fiber ends being separably-binded together by a binding material along a plane defined by said fiber ends, whereby said plurality of fibers form a collated packet that facilitates introduction of the fibers into a castable composition, such as a concrete mix, and also facilitates dispersal and substantially uniform distribution of the fibers within the castable composition. Methods for packeting fibers are also disclosed.

16 Claims, 2 Drawing Sheets

PACKETING FIBERS FOR CASTABLE COMPOSITIONS

This application claims the benefit of provisional application No. 60/120,936, filed Feb. 19, 1999.

FIELD OF THE INVENTION

The present invention relates to fiber packets for modifying castable compositions such as concrete, and particularly to fiber packets formed by collating, cutting, and separably-binding the cut fiber ends together along the plane defined by the cut ends using a binding material that is dispersible within the castable composition. The integral packet facilitates introduction of fibers into, and their subsequent dispersal and substantially uniform distribution within, the castable composition.

BACKGROUND OF THE INVENTION

It is well known in the construction industry to add fibers to fresh concrete to improve characteristics of the resulting hardened concrete structure. Fibers, such as steel, glass, or synthetic materials are typically added to the mixture. See e.g., U.S. Pat. No. 4,665,109 of Pedersen et al.; U.S. Pat. No. 4,426,458 of Woodhams et al.; and U.S. Pat. No. 4,210,009 of Farfor et al., all of which are incorporated herein by reference. Fiber-reinforced concretes are said to have improved fracture toughness as well as a retarded degree of crack propagation.

In the past, concrete-reinforcing fibers have been packaged and sold in polyethylene bags. The bags were added to the concrete mixture by opening the plastic bags and shoveling or dumping fibers directly into a concrete mixer or similar apparatus during the concrete mixing operation. This labor-intensive task is often messy and can result in a non-uniform dispersion of fibers when clumps of fibers become encased in the fresh concrete mixture and resist wetting due to their hydrophobic nature.

U.S. Pat. No. 4,961,790 of Smith et al. discloses a water-soluble bag for introducing reinforcing fibers into concrete. In the aqueous concrete environment, the bag purportedly dissolves and releases the fibers into the concrete.

U.S. Pat. No. 5,224,774 of Valle et al. discloses a non-water-soluble paper packaging system for introducing fibers into an aqueous concrete mixture. The non-water-soluble package is ruptured by the mixing action of concrete, which contains sand and gravel, so that the fibers are released and uniformly distributed throughout the concrete. Clumping of the package is avoided because the non-water-soluble paper packaging material is abraded by the aggregates in the concrete mixing operation.

U.S. Pat. No. 5,807,458 of Sanders et al. discloses fibers which are bundled using a circumferential perimeter wrap. The perimeter wrap must be maintained under sufficient tension to restrict lateral movement of the fibers relative to one another. The perimeter-wrapped bundles are cylindrical and fabricated from a fiber tow or a hank by wrapping the tow or hank with a strip of material in a spiral overlap manner and then cutting the wrapped fibers to provide separate cylindrical fiber bundles. The perimeter wrap comprises a water dispersible material to maintain initial integrity. Sanders et al. state that upon disruption of the continuity of the perimeter wrap and the resulting tension maintained on the reinforcing fibers, the fibers are then rapidly dispersed into the cementitious mixture with minimal, if any, agglomeration because the fibers are maintained in a substantially parallel arrangement on release.

It is an objective of the present invention to facilitate the introduction of a plurality of fibers into a castable composition (such as wet concrete) using a "packeting" rather than perimeter-wrap bundling means, and, upon agitation of the castable composition, to separate individual fibers from the packeting, and to obtain dispersal of the fibers within, and substantially uniform distribution of the individual fibers throughout, the castable composition.

SUMMARY OF THE INVENTION

In surmounting the disadvantages of the prior art and providing improved fiber systems for use in modifying castable compositions, such as concrete, the present invention provides novel fiber packets having improved convenience in packaging, handling, shipment and transportation, dosing, and ease of use.

An exemplary fiber packet of the invention comprises a plurality of fibers arranged in side-by-side manner, the plurality of fibers being cut perpendicularly to obtain terminal cut ends, and the terminal cut fiber ends being separably-binded together along a plane defined by said terminal cut fiber ends. The term "separably-binded," as used herein, means that the fiber ends are bonded or adhered together using a dispersible binder material. Upon agitation of the castable composition, the fiber ends are separable due to the abrading action of the aggregates in the composition and/or the dissolving action of the aqueous mixture on the binding material.

An exemplary binder material for separably-binding the fiber ends may include a polysaccharide, gelatin, poly(meth) acrylic acid, wax, or a mixture thereof. In one exemplary process of the invention, a hot wax (e.g., in thermally softened form) can be spray applied or coated across the cut terminal ends of the fibers and allowed to solidify to bind the fiber ends together. In other exemplary embodiments, the cut fiber ends may be separably-bonded together such as by using a water-swellable or water-dispersible binder material. Conventional adhesive materials, such as pressure-sensitive adhesive or hot-melt adhesive, may also be used. For example, the fiber packets may be formed by using conventional masking tape (e.g., a paper carrier layer having an adhesive layer such as an elastomeric material, e.g., a butyl rubber-based adhesive, or other conventional adhesive material).

An exemplary process of the invention for packeting a plurality of fibers comprises providing a plurality of fibers in a side-by-side manner, cutting the fibers perpendicularly to obtain cut terminal ends, and separably-bonding together the fibers along a plane defined by the cut terminal ends.

BRIEF DESCRIPTION OF DRAWINGS

A further comprehension of the advantages and features of the invention may be facilitated by reference to the detailed description in conjunction with the accompany drawings wherein.

DETAILED DESCRIPTION OF EXEMPLARY EMBODIMENT

Figure 1:
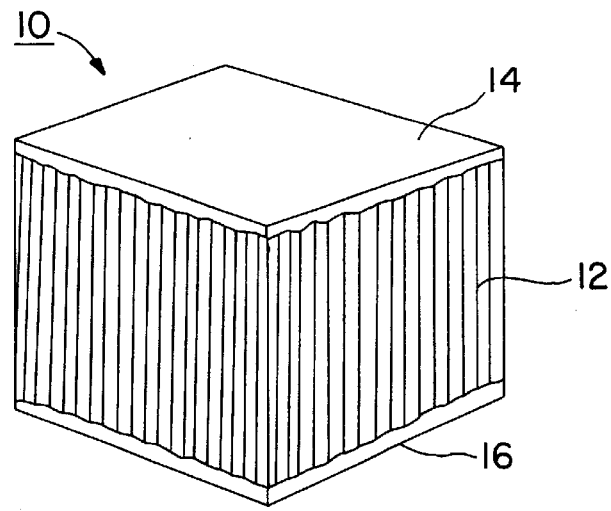
FIG. 1 is a perspective view of an exemplary fiber packet of the invention.

One objective of the present invention is to provide fiber packets to facilitate the introduction of a plurality of fibers into, and their dispersal within (e.g., separation from other fibers) and substantially uniform distribution throughout a castable composition, such as wet concrete. Upon agitation of the castable composition, it is intended that the packeting means, which comprises at least one layer of "dispersible" binder material becomes broken down (e.g., by dissolving and/or mechanical abrading) within the castable composition. In other words, the packeting means can be dissolved by the water within the castable composition or abraded by mechanical grinding action of solids (e.g., sand and gravel aggregate) within the castable composition (e.g., concrete), and subsequently distributed within the castable composition.

The term "castable composition" refers both to liquid/solid and liquid mixtures. A preferred example is a cementitious mixture such as concrete, mortar, or masonry cement. For example, a concrete mixture comprises a cementitous binder (e.g., Portland cement), a fine aggregate (sand), a course aggregate (gravel), and water.

The term "fiber packet" is used herein and throughout to provide a directly contrasting concept to the tightly perimeter-wrapped fiber bundles taught in U.S. Pat. No. 5,807,458 of Sanders et al. Unlike the perimeter wrap designs, fiber packets of the present invention are not easily susceptible to slipping out of a wrap, and, unlike the bundles of Sanders et al. which avoid interbundle fiber-to-fiber bonding, the present invention relies on end-to-end bonding of immediately adjacent fibers. Accordingly, it is believed that the packeted fibers of the present invention function in an entirely different manner because the fibers in the present invention are not instantly released but rather in a gradual and not necessarily aligned fashion.

The packeting of the present invention involves separably binding together the cut terminal ends of collated fibers, which means that each individual fiber is separably-binded at a cut terminal end and yet these fibers are considered to be "separable" because it is intended that they become separated from each other after the packet is introduced into the concrete which is then agitated (mixed) to initiate the process of abrading and/or dissolving the binder material which initially holds the fiber ends together.

Conventional fibers and fiber materials as used in the construction industry are contemplated for exemplary use in the invention. Such fibers are typically elongate in shape and have lengths which far exceed fiber thickness and/or width, and are available in monofilament or fibrillated form. Typically, the length of such fibers exceeds the width or thickness of the fibers by a multiple of at least 100. Known fiber materials comprise steel, glass, acrylic, polyester, polyamide (e.g. nylon), polyolefin (e.g., polyethylene, polypropylene, or mixture thereof), cellullosic materials, or a mixture thereof. Fiber materials that are customarily used for reinforcing and/or reducing crack shrinkage in concrete and cementitious compositions are especially suitable for use in the present invention. The packeting systems of the present invention are especially appropriate for use in mixing polyolefin fiber materials, which are generally hydrophobic, into aqueous environments such as concrete mixes.

Fibers may be optionally coated, for example, with conventional wetting agents or surfactants to alter their surface tension characteristics. Examples of such materials include fatty acid esters of glycerides, fatty acid amides, polyglycol esters, polyethoxylated amides, non-ionic surfactants and cationic surfactants. Alternatively, the fibers may be optionally coated with bond enhancement materials, for example, such as the glycol or glycerol ether bond enhancement agents as taught in U.S. Pat. No. 5,753,368 of Berke et al., which is incorporated by reference herein. A preferred agent is di-propylene glycol-t-butyl ether. In further exemplary embodiments, the may be optionally coated with any of the foregoing coating materials, or even may be coated with interpacket fiber-to-fiber bonding materials which are dispersible within the castable composition, without departing from the scope of the invention.

As shown in FIG. 1, an exemplary fiber packet 10 of the present invention comprises a plurality of fibers 12 which are arranged in side-by-side manner and cut perpendicularly to form top 14 and bottom 16 terminal cut ends. These terminal cut fiber ends (14/16) may be "separably-binded" together generally along the plane defined by the terminal cut ends (e.g., along flat top and bottom surfaces formed by the ends) using a water-dispersible or concrete dispersible binding material. On the top and bottom ends, therefore, is shown a dispersible binder material (designated as at 14 and 16).

The term "dispersible binder material" means and refers to materials which function to bind the terminal fiber ends together and which can dissolve and/or abrade within the castable composition (e.g., concrete). These binder materials may comprise a polysaccharide, gelatin, poly(meth)acrylic acid, a wax, or a mixture thereof. The water-dispersible binder material may be applied to the cut terminal ends of the fibers, for example, by roller coating or spray-application. Thus, the dispersible binder material may comprise a layer of wax that has been thermally softened in film form or spray-coated onto the cut terminal ends of the fiber. Alternatively, a wax covered paper can be melt-bonded to the cut terminal ends of the fibers. As another example, a conventional pressure-sensitive adhesive tape, such as masking tape (paper backing) can also be used for this purpose. Thicknesses of the binder material to be employed will depend on the nature of the binder material, the ability or tenacity of the material in bonding or adhering the cut terminal ends of the fibers together, and the dispensability of the binder material within the castable composition.

The binder material for separably-binding the cut terminal ends of the fibers together may also comprise materials known to be suitably dispersible in concrete mixes. For example, European Patent 0 546 699 B1 of De Mars et al., incorporated fully herein by reference, discloses concrete-dispersible capsules made of wax, such as paraffin wax, which can include additives to modify the properties of the wax. For example, ethylene vinyl acetate can be added to modify the brittleness or plasticity of the wax. In the present invention, such a wax, with or without additives, can be melted so as to adhere to cut terminal ends of fibers, and provide suitable dispensability when subjected to the grinding action of an agitated concrete mixture.

Thus, an exemplary process for providing fiber packets 10 of the invention comprises cutting a plurality of fibers to obtain cut terminal ends, and melt-coating a separably-binding material, such as a wax, onto the cut terminal ends of the fibers.

Figure 2:
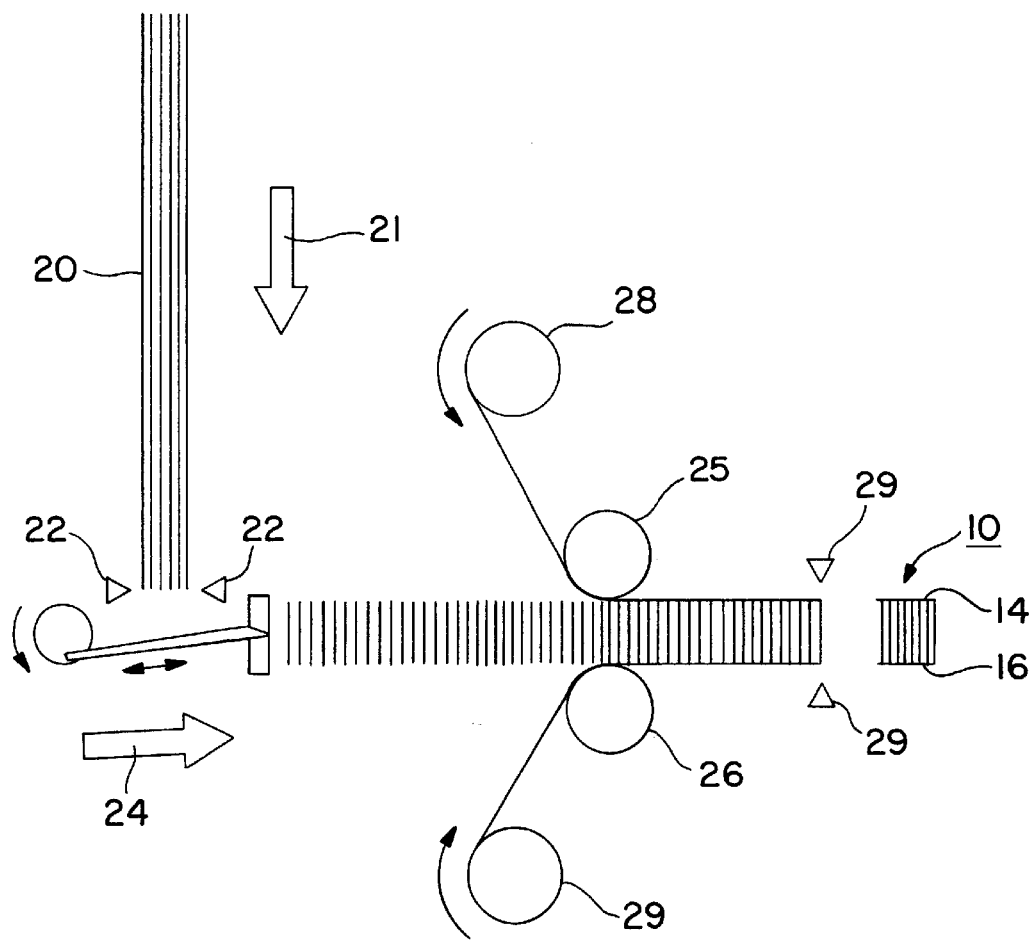
FIG. 2 is a schematic diagram of an exemplary process of the invention for providing a fiber packet of present invention.

A further exemplary process for providing fiber packets 10 of the invention is shown in FIG. 2. A plurality of collated fibers 12 is provided (such as by extrusion or sourcing from a storage reel) and cut using cutting means 22 which can be single or multiple blades. The cut fibers, having top and bottom cut terminal ends, are advanced along a line, such as by a pushing device 23 (or reciprocating piston-like device) that advances the fibers along a channel (not shown).

Alternatively, a reciprocating piston-like device can include both a blade and a flat portion, respectively, for cutting the fibers to desired length and pushing the cut fibers along a channel or assembly line where they can separably-binded together by coating or taping or melt-adhering means.

As shown in FIG. 2, the cut fibers are passed through nip rollers 25 and 26 which facilitate application of the fiber-binding material (e.g., adhesive tape or wax-covered paper) from take-off reels 28 and 29 onto the top 14 and bottom 16 terminal cut ends of the fibers 12. The nip rollers 25 and 26 can be heated so as to thermally-soften certain fiber binding materials, such as wax or thermoplastic polymeric materials. The end-bound fibers can then be sectioned by cutting means 29, such as blades, to provide a fiber packet 10 of the kind shown in FIG. 1.

The binding material which is pulled off from reels 28 and 29 may therefore comprise pressure-sensitive adhesive, melt-adhesive, thermoplastic polymer, or other binding material. In a preferred embodiment, the binding material 28 and 29 is in the form of an adhesive tape comprised of a carrier layer and a conventional pressure-sensitive adhesive layer such as a butyl-based adhesive or other elastomeric material. The carrier layer may be comprised of a water-soluble or non-water-soluble paper or film material, and is preferably made of paper coated with wax, silicone, or other suitable release material so that the adhesive can be rolled up onto itself and unrolled by pulling from the roll.

In still further embodiments, the fiber binding material may incorporate one or more conventional concrete admixtures, preferably in solid form, including but not limited to a surface active agent, a water reducer, a superplasticizer, a shrinkage reduction admixture, an air-entraining admixtures, an air-detraining admixture, corrosion-inhibitor, and the like. Recognized categories of conventional admixtures are described in U.S. Pat. No. 5,203,629 of Valle et al., which is incorporated as if fully set forth herein.

A preferred fiber packet of the invention thus comprises a plurality of side-by-side polyolefin fibers, preferably polyethylene and/or polypropylene monofilament fibers, having cut terminal ends which are separably-binded together, along the planes defined by the cut fiber ends, using a dispersible binding material coating which is melt-applied onto the cut fiber ends. Alternatively, the fibers can be separably-binded together using a conventional adhesive tape having a paper backing and a conventional (e.g., butyl-based) adhesive layer material. Preferably, the paper has a basis weight of less than 50 pounds and more preferably less than 30 pounds. The exact compositional requirements for the adhesive tape are not critical so long as the materials can be dispersed within the castable composition being treated.

Figure 3A:
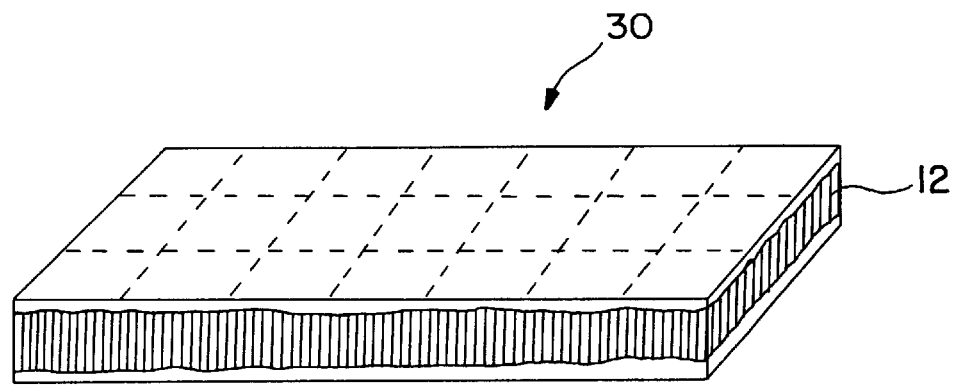
FIGS. 3A through 3C provide perspective views of another exemplary fiber packet system of the invention.
Figure 3B:
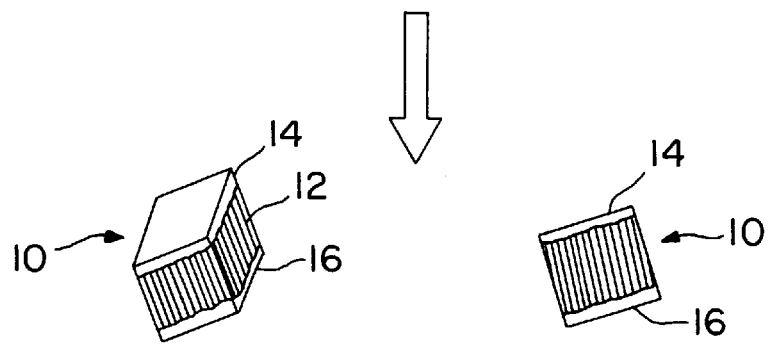

As shown in FIG. 3A, a further exemplary fiber packet 30 comprises a plurality of fibers which are essentially "sandwiched" between and disposed in substantially perpendicular orientation with respect to a first layer 32 and second layer of scored binder material or perforated paper having a binder material which separably binds the fibers together to form a packet that can be broken, either by hand or during dispersal in the castable composition, into uniformly smaller-sized packets 10. Preferably, both of the fiber binding material layers are scored (if solidified film or coating) or perforated 31 (where coated paper or other carrier is used) in a corresponding fashion such that the fiber packet designated at 30 in FIG. 3A can be broken up relatively more easily into uniformly sized cubes or rectangular shapes 10 as shown in FIG. 3B. Subsequently, as shown in FIG. 3C, the individual fibers 12 can eventually be separated from the broken-down smaller packets 10 (e.g., "dispersed") and then substantially uniformly distributed within the concrete mix.

Figure 3C:
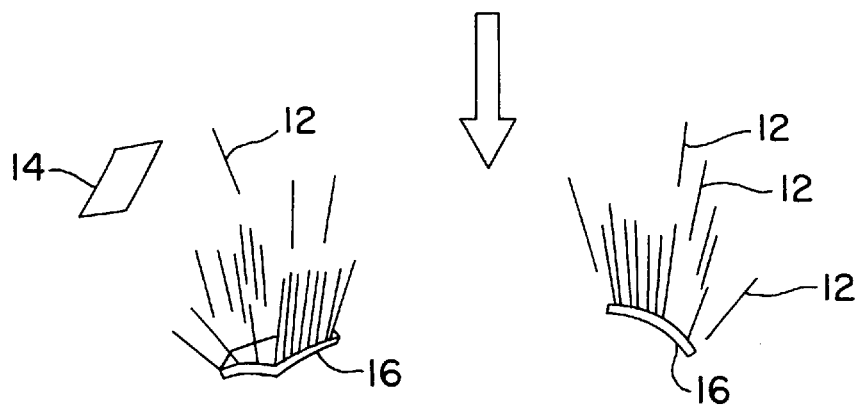

It may be helpful to note in reference to FIG. 3C that the use of fiber binding material at opposite cut terminal ends of fiber packets is particularly advantageous in that, during agitation of the castable composition (e.g., concrete mix), the binding material will progressively break down (e.g., dissolve and/or abrade) but will most likely not release all of the fibers individually in the exact same instant nor will the fibers tend to be released all in the same alignment or orientation; and, accordingly, these features will tend to avoid or minimize, it is believed, the clumping of fibers within the castable composition.

It is also envisioned that in further exemplary embodiments of the invention, the binding material used for one of the cut terminal fiber ends can be different, or have a different cohesive or adhesive property, from the binding material used for the opposite other cut terminal fiber ends. Although not believed to be necessary, the use of different binding material, different thickness of binding material, and/or binding materials having different binding performance or dispensability characteristics (e.g., the binding material will tend to dissolve or mechanically abrade at different rates) will enhance the possibility that the fibers will not be released all at the same moment, but will tend to separate in a gradual manner, as illustrated in FIG. 3C, to avoid or minimize clumping and the kind of interfiber interactions that can lead to clumping. For example, the binding material on top 14 of the packet may comprise a thinner paper and/or more-easily-dispersible wax material than the binding material used on the bottom of the packet.

The foregoing preferred embodiments and examples are intended for illustration only and therefore not intended to limit the scope of the invention.

It is claimed:

1. A fiber packet comprising: a plurality of fibers arranged in side-by-side manner, said plurality of fibers being cut perpendicularly to obtain terminal cut ends, and said terminal cut fiber ends being separably-binded together at opposing ends of individual fibers by a binding material along planes defined by said fiber cut ends, said binding material comprising a paper sheet coated with wax, a pressure-sensitive adhesive, or elastomeric coating material, said binding material being operative to disperse within concrete when said fiber packet is introduced into and agitated within concrete, whereby said plurality of fibers form a collated packet for introducing said plurality of fibers at the same time into concrete.

2. The fiber packet of claim 1 wherein said plurality of fibers are coated.

3. The fiber packet of claim 1 wherein said plurality of polymeric fibers comprise a polyolefin material.

4. The fiber packet of claim 1 wherein said plurality of fibers comprise polypropylene.

5. The fiber packet of claim 1 wherein said binder material is coated onto said cut terminal ends of the fibers.

6. The fiber packet of claim 5 wherein said binder material comprises a thermally-softenable material.

7. The fiber packet of claim 6 wherein said thermally-softenable material comprises a wax.

8. The fiber packet of claim 1 wherein said fiber packet has two opposite cut terminal ends each having a binder material different from the other.

9. The fiber packet of claim 1 wherein said dispersible binder material comprises a wax coated, non-water-soluble paper.

10. The fiber packet of claim 1 wherein said fiber packet has a generally cube or rectangular shape.

11. The fiber packet of claim 1 wherein said dispersible binder material further comprises at least one concrete admixture comprising a surface active agent, a water reducer, a superplasticizer, a shrinkage reduction admixture, an air-entraining admixtures, an air-detraining admixture, corrosion-inhibitor, or mixture thereof.

12. The fiber packet of claim 1 wherein said fibers are polypropylene fibers having a coating, and said dispersible binder material comprises a wax applied as a coating or film along a plane defined by said cut terminal ends of the fibers.

13. The fiber packet of claim 1 wherein said dispersible binder material which is scored to facilitate breaking of the packet into smaller pieces.

14. The fiber packet of claim 1 wherein said paper sheet is perforated to facilitate breaking of the packet into smaller pieces.

15. A process for packeting a plurality of fibers, comprising: providing a plurality of fibers in a side-by-side manner, cutting said fibers perpendicularly to obtain cut terminal ends, and separably binding together at least one of said cut terminal ends along a plane defined by said cut terminal ends, using a sheet-form dispersible binding material, to obtain the fiber packet of claim 1.

16. A fiber packet comprising: a plurality of fibers arranged in side-by-side manner, said plurality of fibers comprising steel, glass, acrylic, polyester, polyamide, polyolefin, cellullose, or a mixture thereof and said plurality of fibers being cut perpendicularly to obtain terminal cut ends; said terminal cut fiber ends being separably-binded together by a dispersible binding material comprising a paper, tape, coated paper, coated tape, or mixture thereof, along a plane defined by said fiber ends, whereby said plurality of fibers form a collated packet.

* * * * *